March 29, 1960

L. T. FLEMING 2,930,871

VIBRATION RESPONSIVE SWITCH

Filed April 7, 1958

INVENTOR

*Lawrence T. Fleming*

BY
*Burns, Doane, Benedict & Irons*
ATTORNEYS

United States Patent Office 2,930,871
Patented Mar. 29, 1960

2,930,871

VIBRATION RESPONSIVE SWITCH

Lawrence T. Fleming, Bellaire, Tex., assignor, by mesne assignments, to Dresser Industries, Inc., Dallas, Tex., a corporation of Delaware Application April 7, 1958, Serial No. 726,714

7 Claims. (Cl. 200—110)

This invention relates to devices for detecting vibration, and more particularly, to a vibration responsive switch.

It is well known that excessive vibration of machinery is an indication of impending failure thereof. The prior art discloses many devices for utilizing this characteristic in order either to operate an alarm or to shut down the machinery. Such devices are usually responsive either to the amplitude of the vibration or to the acceleration thereof. The apparatus of the present invention is designed to respond to the velocity of the vibration, rather than either amplitude or acceleration, in order to obtain a more desirable response to trouble in the machinery which is controlled. The apparatus of the present invention also provides for a displacement of the moving contact of a switch which may be very much greater than the peak amplitude of the vibration, and the apparatus does not employ electron tubes, transistors, or a power supply.

The apparatus to be disclosed is particularly intended for use with a failure alarm or with an automatic shut down system for the protection of such machinery as is employed in pipe line pumping stations.

The apparatus of the invention, generally speaking, includes a magnetic circuit including a source of magnetic flux, a coil inductively related to such circuit, with either the coil or a portion of the magnetic circuit movable in response to the vibration to be detected, a rectifier connected across the coil to cause a D.-C. current to flow therethrough, which current is proportional to the velocity of the vibration, and switch contacts subject to the force generated by such D.-C. current.

The invention will now be described more fully in conjunction with preferred embodiments thereof disclosed in the accompanying drawing.

Figure 1:
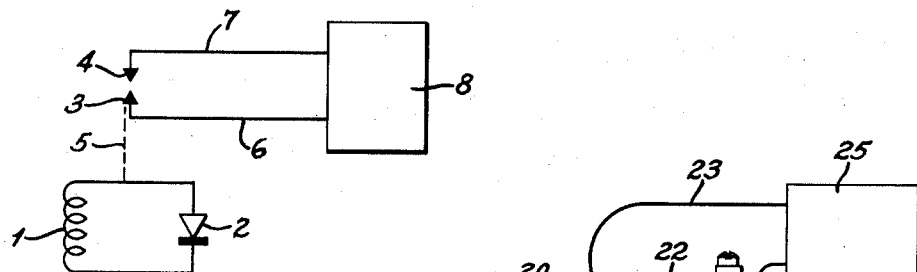
Fig. 1 is a schematic diagram for use in explanation of the principles of the invention.

Referring first to Fig. 1, the apparatus of the invention includes a coil 1 which is inductively related to a magnetic circuit including a source of magnetic flux (not shown). Either the coil or a portion at least of the magnetic circuit is movable with respect to the other in accordance with the vibration to be detected, so that a voltage is developed across the coil which is proportional to the velocity of the vibration. This voltage is converted to a direct current through the coil by a rectifier 2, connected across the coil. The force generated by this direct current is coupled to a pair of normally open contacts 3 and 4 by a mechanical linkage diagrammatically shown at 5. The linkage is such that the force tends to engage the open contacts, and the contacts are engaged when the vibration velocity exceeds a predetermined amplitude. The contacts are shown as connected by leads 6 and 7, respectively, to an electrical circuit diagrammatically illustrated at 8 and which may include an alarm or a shut down control for the machinery whose vibration is monitored by the device illustrated.

Figure 2:
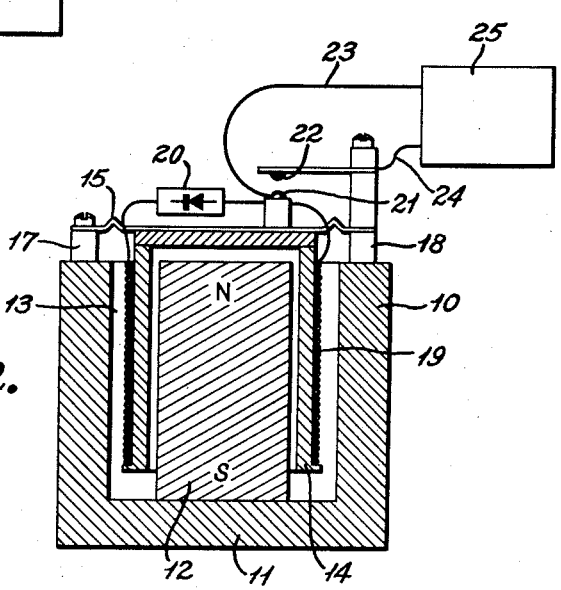
Fig. 2 is a transverse sectional view of one embodiment of the invention.

Referring now to Fig. 2 showing the construction of an actual embodiment of the invention, the apparatus therein illustrated is of the seismic geophone type. That is, it includes a cylinder 10 of ferromagnetic material having a closed end 11, and having a cylindrical bar magnet 12 positioned within the cylinder. The outer diameter of the bar magnet is smaller than the inner diameter of the cylinder, so that an air gap 13 is formed between their adjacent side surfaces. A coil form 14 is supported by a suitable spring 15 extending between the coil form and posts 17 and 18 fixed to and extending upwardly from the cylindrical member 10. A coil 19 is wound on said coil form and extends within the air gap 13.

A rectifier 20 having the polarity indicated in the figure is connected across coil 19 to develop a direct current in the coil in response to voltage generated across it. The coil form 14 also carries a movable contact 21 which extends upwardly therefrom and is movable toward and away from a fixed contact 22. The fixed contact is supported from the post 18 fixed to the cylinder 10. Contact 21 is connected by lead 23, and contact 22 is connected by lead 24, to the alarm or other detecting device 25.

The cylinder 10 and the permanent magnet 12 form a magnetic circuit, with the permanent magnet as the source of magnetic flux. The cylinder is mounted on or mechanically connected to the device whose vibration is to be detected, so that it moves in accordance with such vibration. Since the coil 19 is resiliently supported from the cylinder 10, vibration causes relative movement between the magnetic circuit and the coil, thereby developing a voltage across the coil which has an amplitude proportional to the velocity of the vibration. The rectifier 20 converts this voltage into a direct current in the coil which generates a force tending to move the coil form and contact 21 toward contact 22. When the force exceeds a predetermined level, the contacts engage and the alarm or other control circuit 25 is completed. Since the force tending to move the contact 21 toward the contact 22 is proportional to the voltage across the coil, the engagement of the switch contacts is at a predetermined velocity of the vibration.

In the embodiment of Fig. 2, the magnetic circuit itself is moved in accordance with the vibration to be detected, while the coil is relatively stationary with respect to the circuit. The embodiment of Fig. 3 differs from that of Fig. 2 in that the coil and the major portion of the magnetic circuit are maintained fixed with respect to each other and both move in response to the vibration. This embodiment employs the variable reluctance or balanced armature principle. The embodiment includes a C-shaped permanent magnet 30 having an air gap 31 between its opposite magnetic poles. A ferromagnetic reed 32 has one of its ends fixed to the inner wall of the magnet 30 and its body extending outwardly therefrom and through the gap 31. A mass or weight 33 is fixed to the reed adjacent its other end so that the reed is restrained against movement with the magnet 30, at least along a portion of its length.

A coil 34 is positioned within the magnet 30 and embraces the reed 32. A rectifier 35 having the polarity indicated is connected across the terminals of the coil.

The outermost end of reed 32 carries a movable contact 36 which is movable toward and away from a fixed contact 37 supported from the magnet 30. The fixed and movable contacts are connected to the alarm or other control circuit 37 by leads 38 and 39, respectively.

Figure 3:
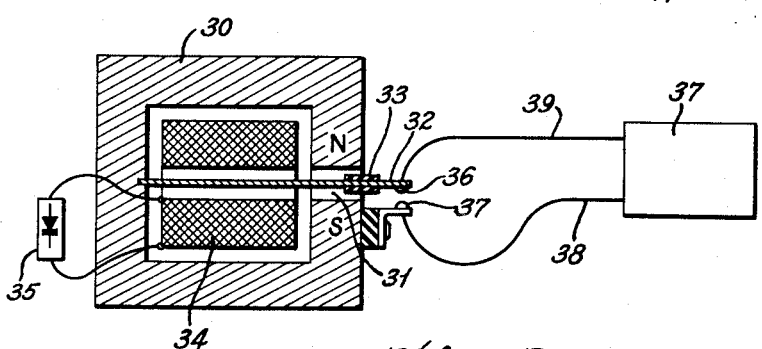
Fig. 3 is a transverse sectional view of a second embodiment of the invention.

In operation of the embodiment of Fig. 3, the magnet and coil move in accordance with the vibration to be detected, so that there is relative movement between the reed and the poles adjacent the gap 31. This movement changes the reluctance of the magnetic circuit to which coil 34 is linked, so that the coil generates a voltage proportional to the velocity of the movement. This voltage is changed into a D.-C. current proportional thereto by rectifier 35, and the current generates a force on reed 32 tending to cause the reed to move contact 36 into engagement with contact 37. If the velocity of the vibration exceeds a predetermined amplitude, the force on the reed likewise exceeds a predetermined value and causes engagement of the contacts.

It will be evident that the displacement of the moving contact in each one of the embodiments described can be made much greater than the peak amplitude of the vibration being detected. It will also be evident that the switching device integrates several cycles of vibration before the contacts close, so that the contacts will not engage merely because of one excessive excursion of vibration. A particularly important advantage of the invention is that it employs no electron tubes, transistors or power supply, so that failure is extremely unlikely, and so that the cost of the switch is quite small.

Many minor changes could be made in the apparatus disclosed specifically herein, so that the invention is not to be considered limited to the embodiments disclosed, but rather only by the scope of the appended claims.

I claim:

1. A vibration-responsive switch comprising a magnetic circuit including a source of magnetic flux, a coil inductively related to said magnetic circuit, one member of said coil and a portion at least of said magnetic circuit being movable with respect to the other in accordance with the vibration to be detected, a rectifier connected across said coil operable to furnish a D.-C. voltage proportional to the velocity of such movement, a contact movable with said one member, and a fixed contact opposite said movable contact, said movable member being urged in such direction as to engage said contacts when the D.-C. current through said coil exceeds a predetermined amplitude.

2. A vibration-responsive switch comprising a magnetic circuit including a source of magnetic flux, a coil inductively related to said magnetic circuit, said magnetic circuit being movable with respect to said coil in accordance with the vibration to be detected, a rectifier connected across said coil operable to furnish a D.-C. voltage proportional to the velocity of such movement, a contact movable with said coil and a fixed contact mounted on said magnetic circuit, said coil being urged in such direction as to engage said contacts when the D.-C. current through said coil exceeds a predetermined amplitude.

3. A vibration-responsive switch comprising a cylinder of magnetic material closed at one end, a cylindrical bar magnet in said cylinder having one of its pole faces abutting said closed end of said cylinder, said magnet having a smaller outer diameter than the inner diameter of said cylinder to form a gap between them, a coil form carrying a coil resiliently supported from said cylinder with the coil within said gap, a rectifier connected across said coil, a movable contact fixed to said coil form, a fixed contact mounted on said cylinder axially spaced from the movable contact, said rectifier being so polarized that D.-C. current through the coil resulting from vibration velocity of the cylinder tends to move the coil in direction to engage said contacts.

4. A vibration-responsive switch comprising a magnetic circuit including a source of magnetic flux, said magnetic circuit being C-shaped in cross section to form an air gap, a reed of magnetic material having one of its ends fixed to said magnetic circuit remotely of said gaps and having its body extending through said gap, a coil fixed to said magnetic circuit and embracing said reed, a rectifier connected across said coil, a movable contact fixed to the other end of said reed, and a fixed contact fixed to said magnetic circuit in the path of movement of the movable contact, said coil and rectifier being operable to generate a D.-C. current through the coil proportional to the velocity of vibration of the magnetic circuit and the resulting force on said reed from said current being operable to urge said movable contact toward said fixed contact.

5. The apparatus of claim 4 in which said magnetic circuit is a permanent magnet having opposite polarity poles facing each other across said air gap, and including a mass on said reed adjacent said other end thereof to inhibit movement of said other end of the reed with the permanent magnet.

6. A vibration-responsive switch comprising a magnetic circuit including a source of magnetic flux, a coil inductively related to said magnetic circuit, one of said coil and a portion at least of said magnetic circuit being movable with respect to the other in accordance with the vibration to be detected, said coil being operable to develop a voltage thereacross proportional to the velocity of said vibration, a rectifier connected across said coil operable to cause a direct current proportional to said voltage to flow through said coil and generate a force proportional to said current, and a pair of contacts, one of said contacts being movable in accordance with said force toward the other to engage said contacts when the velocity of said vibration exceeds a predetermined amplitude.

7. A vibration-responsive switch comprising a magnetic circuit including a source of magnetic flux, a coil inductively related to said magnetic circuit, one of said coil and a portion at least of said magnetic circuit being movable with respect to the other in accordance with the vibration to be detected, said coil being operable to develop a voltage thereacross proportional to the velocity of said vibration, a rectifier connected across said coil operable to cause a direct current proportional to said voltage to flow through said coil and generate a force proportional to said current, and a pair of contacts subject to said force to cause movement of one contact with respect to the other operable to do one of engaging and disengaging the contacts when the velocity of said vibration exceeds a predetermined amplitude.

References Cited in the file of this patent

UNITED STATES PATENTS

| 1,548,697 | Young | Aug. 4, 1925 |
| 1,844,121 | Hibbard | Feb. 9, 1932 |
| 2,150,854 | Whidden | Mar. 14, 1939 |
| 2,754,435 | Ongaro | July 10, 1956 |
| 2,813,988 | Griffin et al. | Nov. 19, 1957 |
| 2,846,207 | Marggraf | Aug. 5, 1958 |